United States Patent [19]

Hoopman et al.

[11] Patent Number: 5,070,606

[45] Date of Patent: Dec. 10, 1991

[54] METHOD FOR PRODUCING A SHEET MEMBER CONTAINING AT LEAST ONE ENCLOSED CHANNEL

[75] Inventors: Timothy L. Hoopman; Dee L. Johnson; Harlan L. Krinke, all of St. Paul, Minn.

[73] Assignee: Minnesota Mining and Manufacturing Company, St. Paul, Minn.

[21] Appl. No.: 416,952

[22] Filed: Oct. 4, 1989

Related U.S. Application Data

[63] Continuation of Ser. No. 224,336, Jul. 25, 1988, abandoned.

[51] Int. Cl.⁵ .................................................. C25D 1/08
[52] U.S. Cl. ................................ 29/890.03; 29/163.6; 29/426.4; 29/426.6; 29/726; 148/13; 148/127; 148/130; 264/317; 264/221; 295/138
[58] Field of Search .................. 264/317, 221, 248; 204/3, 11, 14.1; 148/13, 127, 130; 29/890.03, 890.036, 163.6, 419.1, 426.1, 426.4, 426.6, 726, 727

[56] References Cited

U.S. PATENT DOCUMENTS

| | | | |
|---|---|---|---|
| 2,365,670 | 12/1944 | Wallace | 204/9 |
| 2,898,273 | 8/1959 | La Forge, Jr. et al. | 204/9 |
| 3,325,881 | 6/1967 | Engelking | 29/153.5 |
| 3,329,588 | 7/1967 | Mears | 204/9 |
| 3,332,858 | 7/1967 | Bittinger | 204/11 |
| 3,445,348 | 5/1969 | Aske | 204/9 |
| 3,520,357 | 7/1970 | Bruner | 165/166 |
| 3,630,799 | 12/1971 | Crimmins | 264/248 |
| 3,654,009 | 4/1972 | Judd et al. | 156/155 |
| 3,686,081 | 8/1972 | Butter et al. | 204/16 |
| 3,692,637 | 9/1972 | Dederra et al. | 204/9 |
| 3,709,797 | 1/1973 | Stobo | 204/16 |
| 3,752,751 | 8/1973 | Hirose | 204/181 |
| 3,763,001 | 10/1973 | Withers | 204/16 |
| 3,767,759 | 10/1973 | Wichterle et al. | 264/313 |
| 3,813,767 | 6/1974 | Sasaki et al. | 29/604 |
| 3,829,963 | 8/1974 | McDougall et al. | 29/599 |
| 3,847,211 | 11/1974 | Fischel et al. | 165/166 |
| 3,850,762 | 11/1974 | Smith | 204/11 |
| 3,896,010 | 7/1975 | Vetter | 204/28 |
| 3,901,731 | 8/1975 | Warszawski et al. | 136/86 |
| 3,980,747 | 9/1976 | Nakagawa et al. | 264/221 |
| 3,989,602 | 11/1976 | McCandless et al. | 204/9 |
| 4,022,585 | 5/1977 | Kaye | 428/551 |
| 4,049,024 | 9/1977 | Aubors et al. | 140/71.5 |
| 4,078,604 | 3/1978 | Christl et al. | 165/133 |
| 4,094,688 | 6/1978 | Wolf | 106/38.2 |

(List continued on next page.)

FOREIGN PATENT DOCUMENTS

| | | |
|---|---|---|
| 0124428 | 7/1984 | European Pat. Off. . |
| 2016735 | 7/1971 | Fed. Rep. of Germany . |
| 45-16886 | 6/1970 | Japan . |
| 47-6078 | 2/1972 | Japan . |
| 48-366 | 1/1973 | Japan . |
| 48-16825 | 3/1973 | Japan . |
| 50-31197 | 3/1975 | Japan . |
| 51-11053 | 1/1976 | Japan . |
| 52-14259 | 2/1977 | Japan . |
| 58-26996 | 2/1983 | Japan . |
| 62-7872 | 1/1987 | Japan . |
| 651700 | 9/1985 | Switzerland . |
| 1137127 | 12/1968 | United Kingdom . |
| 1199404 | 7/1970 | United Kingdom . |

OTHER PUBLICATIONS

Article entitled "Fabricating Closed Channel by Electroforming", by H. R. Johnson and J. W. Dini; *Plating and Surfce Finishing;* pp. 456–461; May 1975.

(List continued on next page.)

*Primary Examiner*—Jay H. Woo
*Assistant Examiner*—J. F. Durkin
*Attorney, Agent, or Firm*—Gary L. Griswold; Walter N. Kirn; Mark W. Binder

[57] ABSTRACT

A method for producing an article having a body with one or more enclosed channels extending therethrough such as for the circulation of fluids. The body is formed preferably by metal deposition about one or more fibers to generate the enclosed channels with at least one end of the fibers extending beyond the body. The fibers are then extracted from the channels in the body to leave open the channels through which fluid may be circulated.

24 Claims, 3 Drawing Sheets

U.S. PATENT DOCUMENTS

| | | | |
|---|---|---|---|
| 4,141,802 | 2/1979 | Duparque et al. | 204/15 |
| 4,147,201 | 4/1979 | Rabinovitch et al. | 164/35 |
| 4,182,412 | 1/1980 | Shum | 165/133 |
| 4,250,943 | 2/1981 | Rabinovitch et al. | 164/35 |
| 4,285,779 | 8/1981 | Shiga et al. | 204/9 |
| 4,341,823 | 7/1982 | Sexton et al. | 427/404 |
| 4,390,588 | 6/1983 | Ebneth et al. | 428/263 |
| 4,401,519 | 8/1983 | Kadija et al. | 204/11 |
| 4,432,838 | 2/1984 | Kadija | 204/11 |
| 4,435,252 | 3/1984 | Kadija | 204/11 |
| 4,439,768 | 3/1984 | Eneth et al. | 343/18 B |
| 4,476,206 | 10/1984 | Viala et al. | 429/234 |
| 4,516,632 | 5/1985 | Swift et al. | 165/167 |
| 4,522,889 | 7/1985 | Ebneth et al. | 428/614 |
| 4,541,171 | 9/1985 | Buckley | 29/605 |
| 4,567,505 | 1/1986 | Pease et al. | 357/81 |
| 4,568,603 | 2/1986 | Oldham | 428/195 |
| 4,569,391 | 2/1986 | Hulswitt et al. | 165/166 |
| 4,622,621 | 11/1986 | Barre | 361/382 |
| 4,624,751 | 11/1986 | Morin et al. | 204/28 |
| 4,643,918 | 2/1987 | Orban | 427/304 |
| 4,645,573 | 2/1987 | Orban | 204/14.1 |
| 4,645,574 | 2/1987 | Orban | 204/14.1 |
| 4,669,820 | 6/1987 | Berge | 350/96.20 |
| 4,680,093 | 7/1987 | Morin | 204/28 |
| 4,681,724 | 7/1987 | Faiz et al. | 264/257 |
| 4,712,158 | 12/1987 | Kikuchi | 361/385 |
| 4,770,828 | 9/1988 | Rogier et al. | 264/56 |
| 4,871,623 | 10/1989 | Hoopman | 428/586 |

OTHER PUBLICATIONS

Wilson, Edward A. "Integral Liquid-Cooling System Simplifies Design of Densely Packaged Computer", *Electronics*, Jan. 26, 1984.

Keyes, Robert W. "Heat Transfer in Forced Convection Through Fins", *IEEE Transactions* on Electron Devices, vol. ED-31, No. 9, Sep. 1984, pp. 1218–1221.

Hollworth, B. R., Gero, L. R. "Entrainment Effects on Impingement Heat Transfer: Part II-Local Heat Transfer Measurements", *Journal of Heat Transfer*, Nov. 1985, vol. 107, pp. 910–915.

Watari, Toshihiko et al. "Packaging Technology for the NEC SW Supercomputer," 35th Electronics Components Conference, Proceedings 1985, pp. 192–198.

Shafer, Donald A. "Basic Electroforming", Hallmark Cards Inc., date unknown; includes a photograph of a recess enclosure as the result of high current density bridging during electroplating.

Tuckerman, D. B. and Pease, R. F. W. "High-Performance Heat Sinking for VLSI", *IEEE Electron Device Letters*, vol. EDL-2, No. 5, May 1981.

Rodia, Carl M. "Electroforming", date unknown.

Article entitled "Optimal Structure for Microgrooved Cooling Fin for High-Power LSI Devices"; dated Oct. 21, 1986; author is S. Sasaki; 3 pages.

Article entitled "Demonstration of High-Performance Silicon Microchannel Heat Exchangers for Laser Diode Array Cooling"; *American Institute of Physics; Appl. Phys. Lett.* 53 (12), Sep. 19, 1988, pp. 1030–1032.

Article entitled "Thermal Management of Surface Mount Power Devices", Reprinted from Aug., 1987 Issue of *Powerconversion Intelligent Motion for Power Electronics & Intelligent Motion Systems Engineers*, by Herb Fick Bergquist.

Brochure entitled "Introducing the ACX* Compact Heat Exchanger-", (an ultra-compact, adaptable, high-performance cooling unit from Astro), 4 sheets. no date available.

Brochure entitled "The Astro ACX Compact Heat Exchanger"; *Astro;* Summer 1986 by John E. Deily.

Brochure entitled "Diode Laser Guide"; Melles Griot; 1987.

Brochure entitled "Flexible Shaft Couplings"; *Servometer;* pp. 1–8. no date available.

Brochure entitled "Miniature Metal Bellows and Electroforms"; *Servometer.* no date available.

Brochure entitled "Micro Drilled Inserts"; Bird Precision; 4 pgs. no date available.

A Technical Data Sheet entitled "Zone Annealed Strip"; *Technical Materials, Inc.*, Jun. 1984 Bulletin; 4 pgs.

Article entitled "Microfabrication of Membranes with Extreme Porosity and Uniform Pore Size", 1988 Elsevier Science Publishers B. V., *Journal of Membrane Science*, 36 (1988), pp. 67–77.

Simons, R. E. and Chu, R. C. "Direct Immersion Cooling Techniques for High Density Electronic Packages and Systems", IBM *Corporation,* pp. 314–321. no date available.

Nakatogawa, Tetsundo, et al., "Heat Transfer of Round Turbulent Jet Impinging Normallly on Flat Plate", University of Tokyo, Tokyo, Japan. no date available.

Goldberg, Norman "Narrow Channel Forced Air Heat Sink", *IEEE Transactions on Components, Hybrids, and Manufacturing Technology,* vol. CHMT-7, No. 1, Mar. 1984, pp. 154–159.

Lyman, Jerry "Special Report Supercomputers Demand Innovation in Packaging and Cooling", *Electronics,* Sep. 22, 1982, pp. 136–143.

Pittier, M. S., Powers, D. M., Schnabel, D. L. "System Development and Technology Aspects of the IBM 3081 Processor Complex", *IBM Journal of Research Development,* vol. 26, No. 1, Jan. 1982, pp. 2–11.

*Encyclopediq of Chemical Technology,* Third Edition, vol. 8, John Wiley & Sons, 1979, pp. 738–750 and 826–868.

METHOD FOR PRODUCING A SHEET MEMBER CONTAINING AT LEAST ONE ENCLOSED CHANNEL

This application is a Continuation of Ser. No. 07/224,336, filed July 25, 1988, now abandoned.

TECHNICAL FIELD

The present invention relates to a method for producing a sheet member having at least one enclosed channel.

BACKGROUND ART

Articles have been constructed in the past having a plurality of discrete tubes bonded to each other, or to a common support structure, forming channels for the circulation of fluids. Additionally, holes may be machined into a solid body to form channels. U.S. Pat. No. 4,712,158 discloses a cooling plate for electronic circuit components. An undulating cooling passage is formed in the cooling plate, such as by abutting two complementary plates having aligned grooves. U.S. Pat. No. 4,516,632 discloses a fluid heat exchanger formed from a stack of thin metal sheets bonded together. Alternating slotted and unslotted sheets form fluid flow channels within the stack.

However, such articles have been difficult and expensive to manufacture, particularly with extremely small, long or closely spaced passageways, or for thin articles.

DISCLOSURE OF THE INVENTION

The present invention provides a method for producing an article having a body with at least one enclosed channel extending through the body. The method comprises the steps of providing a fiber; arranging the fiber in a desired pattern; forming a body about the fiber to envelope the fiber and thereby form an enclosed channel about the fiber; changing the relative cross sectional areas of the fiber with respect to the cross sectional area of the channel so that the channel is larger than the fiber; and extracting the fiber from the body to open the channel.

In addition, the present invention provides for an article having an enclosed channel produced according to the above method.

Thus, the present invention provides a method for producing an article having at least one enclosed channel that is quickly and efficiently constructed and particularly adapted for producing multiple elongated channels of small diameter in a thin article.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
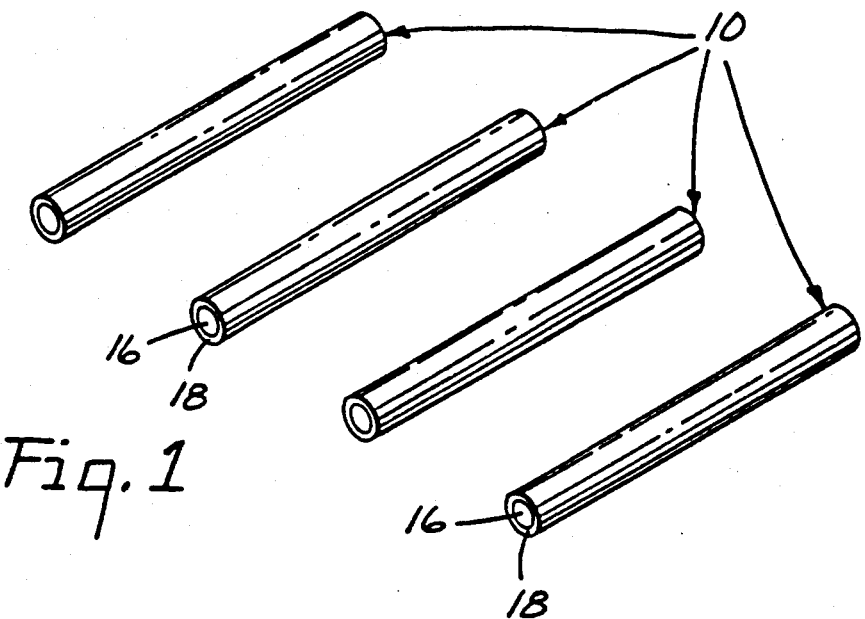
FIG. 1 is a perspective view of a plurality of parallel fibers arranged in a row according to one step in the present invention.

Referring now to FIG. 1, the method of this invention includes the steps of providing at least one fiber 10 and arranging the fiber in a desired pattern, such as a row of parallel straight fibers as shown. For the purposes of this invention, the term "fiber" includes any slender elongate member having a desired cross sectional size and shape and formed from one or more filaments. For instance, a fiber may be formed by twisting or braiding multiple filaments so that the fiber has a helically fluted contour. Any of the one or more filaments forming the fiber may be solid or hollow. In the illustrated embodiment, the fibers each are formed from a single cylindrical filament.

Figure 2:
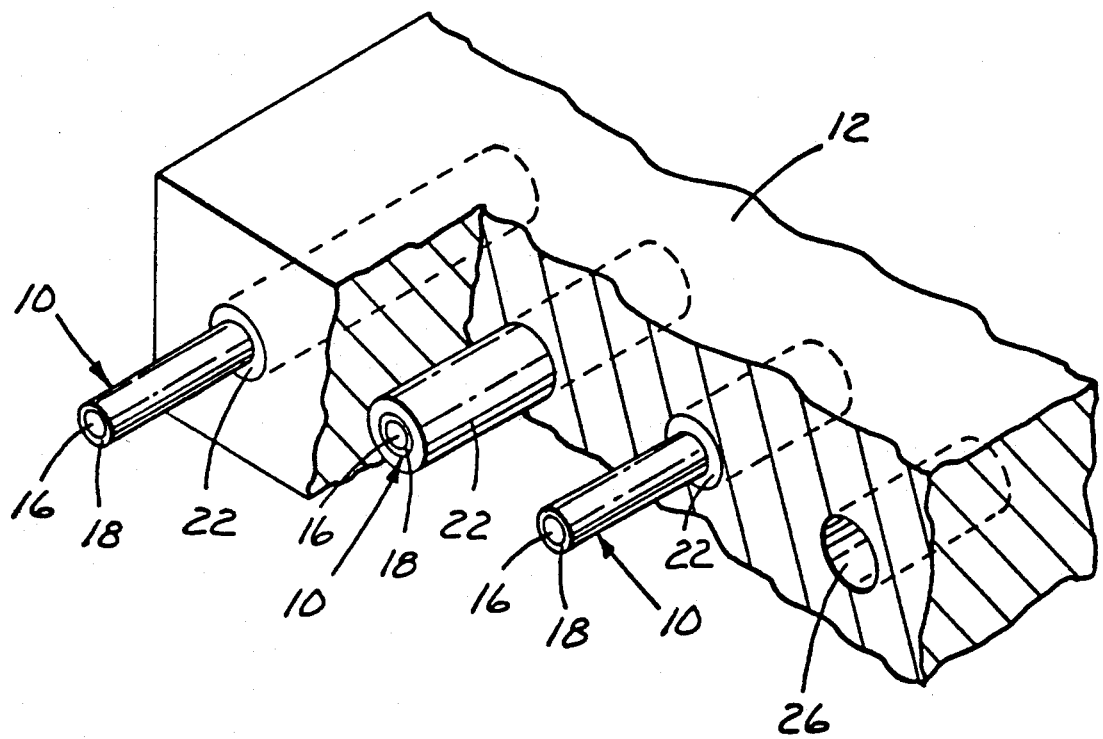
FIG. 2 is a perspective view of a plurality of fibers with a body formed about the fibers, shown partially broken away, to form enclosed channels according to another step in the present invention.
Figure 3:
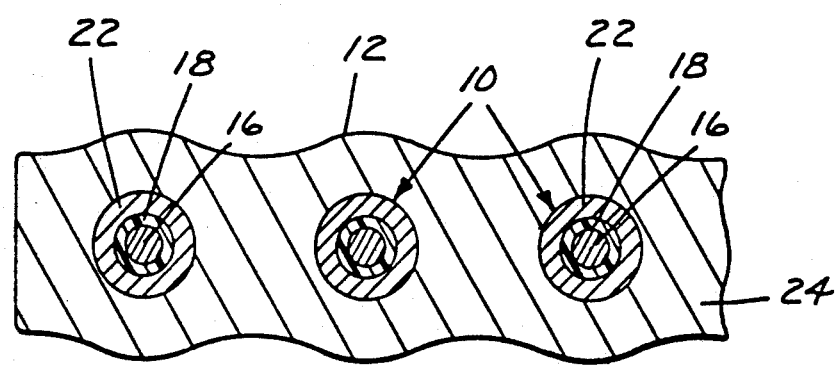
FIG. 3 is a transverse cross sectional view of a portion of the body and fibers according to another step in the present invention.

The article of this invention is constructed by forming body 12 that envelopes the fibers, as shown in FIGS. 2 and 3, With at least one end of each fiber 10 extending beyond the body. Body 12 may be formed such as by molding or casting a plastic or ceramic material about the fibers so that the fibers are completely enveloped by the material and channels 26 are produced in the body about each of the fibers.

However, in the preferred embodiment of the invention, material such as copper and nickel is electrodeposited about the fibers to form body 12 that envelopes the fibers. One or more of the fibers includes an electrically conductive outer surface to attract the electrodepositable material. Non conductive fibers may interspersed with the conductive fibers. The electrically conductive outer surface of the fibers may be provided by constructing the fiber of electrically conductive material, such as a metallic material. Alternatively, the fiber may be constructed of a non conductive material, such as a polymeric material at core 16, with an electrically conductive layer 18, such as a metallic material, coated on the exterior of the core. In another embodiment not shown, fibers having non conductive surfaces are placed adjacent to a conductive plate (not shown) or the like so that the material electrodeposited on the conductive plate envelopes the fibers in a body as herein described. The conductive plate may remain with the body formed about the fibers, if desired.

In one example, an article according to the present invention was produced by providing a continuous fiber of unoriented polypropylene having a circular cross section 0.007 inches (0.018 cm) in diameter. The fiber was wound about a pair of parallel threaded rods (not shown) 10 inches (25.4 cm) long and 0.75 inches (1.9 cm) in diameter spaced apart 3.00 inches (7.6 cm) center to center, forming a part of a rigid framework for supporting the fiber, so that the fiber formed two parallel rows of fiber segments extending between the parallel rods, each of the rows on opposite sides of the rods. The fiber segments in each row had a center to center spacing of 0.018 inches (0.046 cm) determined by the pitch of the threads on the rods. The fiber was adhered to the rods by applying an epoxy over the fiber and the threads on each of the rods. After the epoxy has solidified, one row of the fiber segments were cut away to provide unrestricted access to both sides of the fibers segments in the remaining row when immersed in the plating bath. The exposed portions of the fibers were then metallized to provide a conductive outer surface. All surfaces of the framework and fibers on which material was not to be electrodeposited were covered by a pressure sensitive adhesive vinyl tape.

The framework and remaining row of fiber segments were first immersed in a nickel sulfamate bath (not shown) containing 16 ounces/gallon of nickel; 0.5 ounces/gallon of nickel bromide; and 4.0 ounces/gallon of Boric acid. The remainder of the plating bath was filled with distilled water. A quantity of S-nickel Anode pellets were suspended by a Titanium basket in the plating bath. The plating bath was continuously filtered through a 5 micron filter. The temperature of the bath was maintained at 90° F. A pH of 4.0 was maintained in the plating bath solution. A current density of 20 amps per square foot was applied to the fibers for three hours with the fibers and framework continuously rotated at six r.p.m. about an axis parallel to and equidistant between the threaded rods. An initial layer (22 in FIGS. 2,3,4, 5A,5B, and 5C) of nickel 0.003 inches (0.008 cm) thick was plated individually about each of the fibers, but a common body was not produced.

The fibers and framework were then placed in a second plating bath containing 29 ounces/gallon of Copper Sulfate crystals; 8.0 ounces/gallon of Sulfuric Acid; 50 parts per million (ppm) of Hydrochloric Acid; Cuflex No. 321 (0.6%) and Cuflex No. 320H (0.3%) both marketed by McGean-Rocho Inc. of Cleveland, Ohio. The remainder of the second plating bath was filled with distilled water. A quantity of Phos-Copper Anode pellets were suspended by a Titanium basket in the plating bath. The plating bath was continuously filtered through a 5 micron filter. The temperature of the bath was maintained at 90° F. The framework and remaining row of fiber segments were immersed in the second plating bath and continuously rotated at six r.p.m. A current density of 60 amps per square foot was applied to the second plating bath and the fibers for eighteen hours. Upon removal, a body was produced having an average thickness of 0.075 inches (0.19 cm).

The copper 24 electroformed about the outer layers of nickel in the Example forms a unitary body 12 about the fibers. The nickel defines channels 26 in the body that are resistant to many corrosive materials which may be circulated through the channels after the channels have been opened as described hereinafter, while the copper portion of the body provides efficient heat transfer characteristics. Of course, a body may be electroformed about the fiber using only one material, or more than two, if desired.

Figure 4:
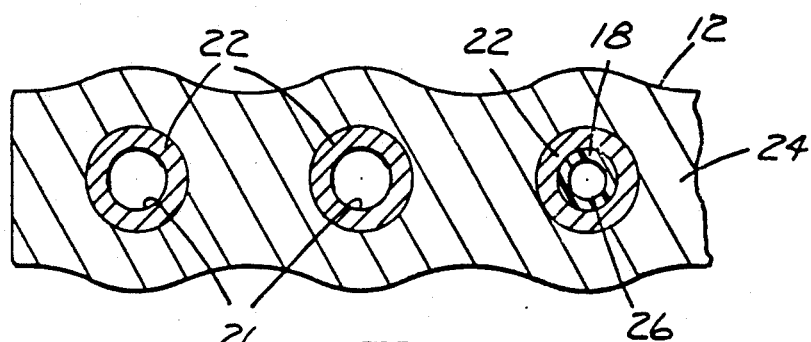
FIG. 4 is a transverse cross sectional view of the body in FIG. 3 with the fibers extracted to open the channels according to another step in the present invention.

After body 12 has been formed about the fibers, the fiber must be extracted from the body to open channels 26, as shown in FIGS. 2 and 4 In the broadest sense, the step of extracting the fibers from the body includes the process of changing the relative cross sectional areas of the channels within the body with respect to the cross sectional areas of the respective fibers within the channels so that the cross sectional areas of the channels are larger than the cross sectional areas of the fibers to facilitate the extraction of the fibers by pulling the fibers from the body. For instance, if the body is constructed of a material having a higher coefficient of thermal expansion than the coefficient of thermal expansion of the material used to construct the fibers, an increase in temperature of the body and fibers will result in the cross sectional areas of the channels increasing relative to the cross sectional areas of the fibers. If the reverse is true, a decrease in the temperature of the body and the fiber will reduce the cross sectional areas of the fibers at a greater rate than the cross sectional areas of the channels in the body. This latter case is typified with the use of certain polymeric fibers enclosed in metallic body. In yet another alternative embodiment, the fibers are constructed from heat shrink tubing so that the application of heat will cause the heat shrink tubing to radially contract within a channel. Once the relative cross sectional areas of the channels has been increased with respect to the cross sectional areas of the fibers, the exposed ends of the fibers may be grasped externally of the body and a tensioning force applied to the fibers sufficient to extract the fibers from the body without exceeding the strength of the fibers. In yet another embodiment, fibers may be provided that are inflatable. Once inflated, the body may be formed about the fibers as herein described. The fibers are then deflated and extracted from the channels.

Figure 5A:
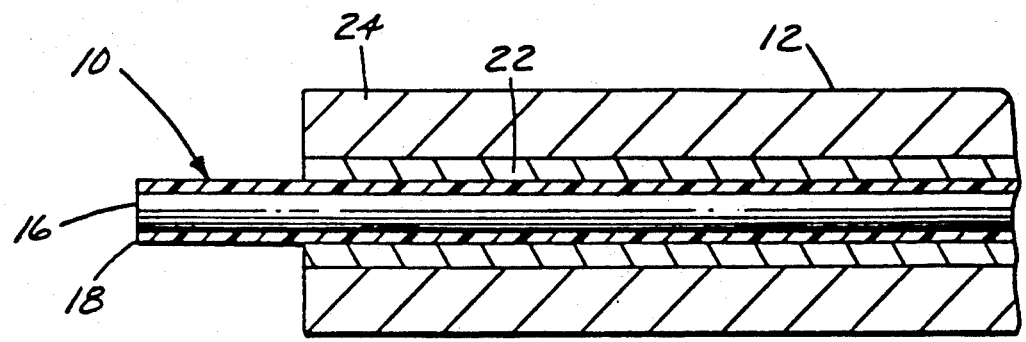
FIG. 5A is a longitudinal cross sectional view of a body constructed according to this invention with a fiber located within a channel.
Figure 5B:
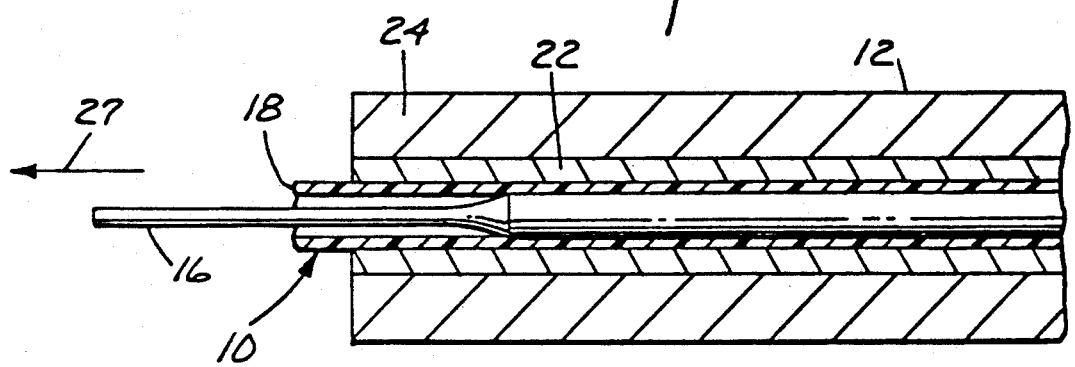
FIG. 5B is a longitudinal cross sectional view of the article of FIG. 5A with a portion of the fiber elongated, reduced in cross sectional area and extracted from the channel.
Figure 5C:
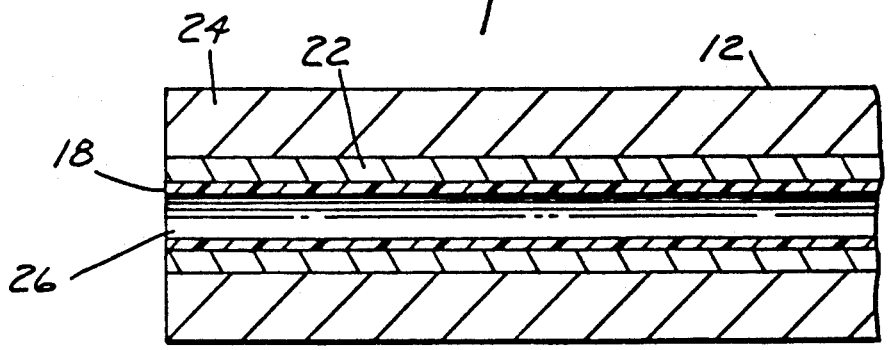
FIG. 5C is a longitudinal cross sectional view of the body of FIG. 5B with the fiber fully extracted and the channel opened.

However, in the preferred embodiment of the invention shown in FIG. 5A, fiber 10 is constructed of material that is extensible in a longitudinal direction 27. Fibers constructed of polymeric materials may be used, such as elastomeric materials. In particular, fibers constructed of unoriented polypropylene have been found to be well adapted for use in the present method. The extensible fiber is removed from the body of the article by gripping the exposed end of the fiber and applying a tensioning force. The material of fiber 10 becomes oriented and elongated in a longitudinal direction, as shown in FIG. 5B, and consequently the cross sectional area of the fiber will be reduced relative to the cross sectional area of the channel. Elongation of the entire fiber will enable fiber 10 to be removed from channel 26 with minimal resistance, as shown in FIG. 5C. If desired, one or more of the fibers may be left in place in the body of the article.

The fibers may be coated with a material that reduces the coefficient of friction between the fiber and the walls of the channel containing the fiber to reduce the force require to extract the fiber from the channel. Lubricants, such as petroleum products or graphite powders may be used for this purpose. As is also shown in FIG. 4, a fiber may be sheathed in an outer layer designed to separate from the fiber and remain in the channel after the remainder of the fiber is removed from the channel. For instance, the sheathed outer layer of a fiber may be constructed of materials, such as glass, that are resistant to corrosive fluids to be circulated through the opened channels. Fibers of this type would eliminate the need to form the body with different materials as in the Example discussed herein.

Figure 6:
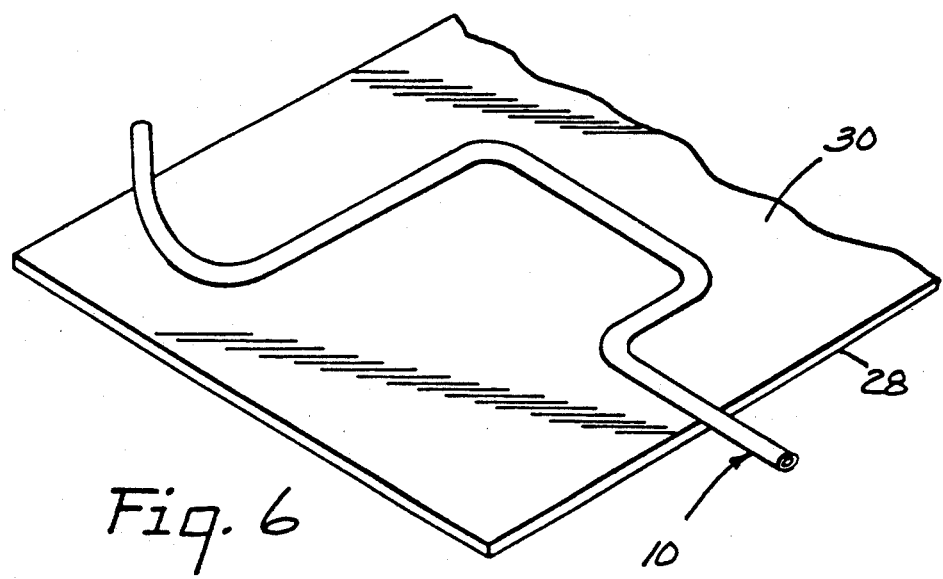
FIG. 6 is a perspective view of an alternative embodiment of this invention with a fiber arranged in a desired pattern on a support structure having an adhesive surface in contact with the fiber.
Figure 7:
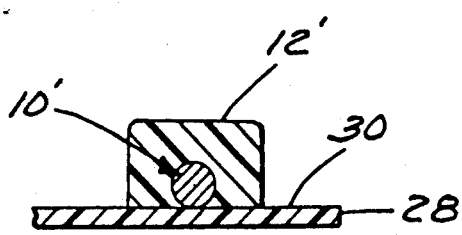
FIG. 7 is a cross sectional view of a body partially formed about a fiber adhered to the support surface of FIG. 6.
Figure 8:
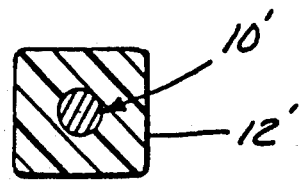
FIG. 8 is a cross sectional view of the fiber of FIG. 7 removed from the support surface and the fiber enveloped by the body.

FIG. 6 illustrates an alternate technique for arranging the fibers. A support structure 28 is provided having a pressure sensitive adhesive surface 30. A fiber 10' may be secured on the adhesive surface 30 in a desired pattern. As shown in FIG. 7, a portion of body 12' is formed about the fiber secured to adhesive surface 30. In FIG. 8, the process of forming the body about fiber 10' is completed by removing the fiber and the body portion 12' away from the adhesive surface 30 and the remainder of the body 12 formed about fiber 10' so that the fiber is completely enveloped by the body.

In yet another alternate arrangement, fibers may be provided that include ductile filaments such as a metallic wire sheathed by an outer layer of heat shrink tubing. Each fiber may be bent into a desired three dimensional pattern and will maintain the pattern until the body is formed about the fibers. The wires may be pulled from the channels. Heat is applied to the body to shrink the heat shrink tubing, enabling the tubing to be extracted from the body and open the channels.

One of the primary applications for a sheet member produced according to the present invention is to circulate fluids through the channels in the sheet member. For instance, an object (not shown) placed in contact with a sheet member will transfer heat in either direction by conduction through the body between the object and a fluid circulated through the channels.

Tables I and II below illustrate the results of a series of tests performed on a sheet member constructed according to the present invention and used for circulation of a fluid for heat transfer purposes. The sheet member used in the tests was 1 inch×1 inch (2.54 cm×2.54 cm) in length and width and 0.033 inches (1.5 cm) in thickness. The sheet member had 162 channels, each having a cross section of 0.00015 square inches (0.0010 $cm^2$).

A silicon wafer 0.4 inches (1.0 cm)×0.6 inches (0.5 cm) thick was soldered to one side of the sheet member by an Indium solder layer 0.005 inches (0.012 cm) in thickness. The silicon wafer was centered along one transverse edge of the sheet member.

In the tests, power was applied to the silicon wafer as shown in the right hand column of Tables I and II. In Table I water was circulated through the channels of the sheet member for conducting heat away from the silicon wafer. The effectiveness of the heat transfer as the applied power was increased is shown in the column entitled "$\Delta$ T Chip to Fluid/° Celsius". In Table II, a fluorochemical, sold under the trademark "FLUORINERT" 43 (a fluorochemical marketed by Minnesota Mining and Manufacturing Company of St. Paul, Minnesota) was substituted for the water.

TABLE I

| | | (water) | | |
|---|---|---|---|---|
| Test No. | Fluid Temp. °C | Flow Rate gr./sec. cm width | Pressure Drop $N/cm^2$ cm Length | $\Delta$ T Chip to Fluid/ °C | Power Density $W/cm^2$ |
| 1 | 23 | 0 | 0 | 15 | 1 |
| 2 | 23 | 2.5 | 0.5 | 11 | 21 |
| 3 | 23 | 2.5 | 0.5 | 20 | 50 |
| 4 | 22 | 5.0 | 1.1 | 19 | 50 |
| 5 | 23 | 5.0 | 1.0 | 30 | 82 |
| 6 | 24 | 10.0 | 2.8 | 26 | 83 |
| 7 | 24 | 10.0 | 2.8 | 49 | 162 |

TABLE I-continued

| | | (water) | | |
|---|---|---|---|---|
| Test No. | Fluid Temp. °C | Flow Rate gr./sec. cm width | Pressure Drop $N/cm^2$ cm Length | $\Delta$ T Chip to Fluid/ °C | Power Density $W/cm^2$ |
| 8 | 24 | 10.0 | 2.7 | 65 | 213 |

TABLE II

| | | ("FLOURINER TM" 43) | | |
|---|---|---|---|---|
| Test No. | Fluid Temp. °C | Flow Rate gr./sec. cm width | Pressure Drop $N/cm^2$ cm length | $\Delta$ T Chip to Fluid/ °C | Power Density $W/cm^2$ |
| 1 | 22 | 0 | 0 | 60 | 6 |
| 2 | 29 | 3.8 | 1.4 | 9 | 15 |
| 3 | 28 | 3.8 | 1.4 | 37 | 57 |
| 4 | 28 | 3.8 | 1.4 | 54 | 82 |
| 5 | 29 | 4.5 | 1.7 | 78 | 110 |
| 6 | 24 | 6 | 2.8 | 8 | 13 |
| 7 | 27 | 6 | 2.8 | 35 | 59 |
| 8 | 28 | 6 | 2.8 | 46 | 84 |
| 9 | 29 | 6 | 2.8 | 64 | 114 |
| 10 | 29 | 6 | 2.8 | 85 | 128 |

A method is thus described for producing an article having one or more enclosed channels extending therethrough that is conveniently and inexpensively constructed. A sheet member may be produced that includes a plurality of elongate channels of small cross sectional area. The size and spacing of the channels is limited only by the size of the fiber that may be enveloped in the body and extracted from the channel. Sheet members may be produced that are thin enough and constructed of a ductile material so as to produce flexible sheet members, such as metallic foils.

The present invention has now been described with reference to several embodiments thereof. It will be apparent to those skilled in the art that many changes can be made in the embodiments described without departing from the scope of the present invention. For instance, the fibers may be arranged in a three dimensional pattern, or with two or more fibers in contact with each other so that the channels formed in the body intersect where the fibers are in contact. Thus, the scope of the present invention should not be limited to the structures described in this application, but only by structures described by the language of the claims and the equivalents of those structures.

What is claimed is:

1. A method of making a heat exchanger system including a unitary heat exchanger having a body with a plurality of enclosed fluid channels extending through said body, comprising the steps of:
    (a) providing a plurality of fibers;
    (b) operatively fixedly attaching each of said plurality of fibers to a means for holding said fibers in fixed positions relative thereto and for arranging said fibers in accordance with a predetermined pattern;
    (c) forming said body about said fibers, as positioned according to said means for holding and arranging said fibers, by depositing body forming material for enveloping said fibers and thereby generating said unitary article with said enclosed channels in said body about each of said fibers;
    (d) changing the relative cross sectional area of at least one of said fibers and said channels so that the cross sectional areas of said channels become larger than the cross sectional areas of said fibers;

(e) extracting said fibers from within said channels thereby leaving open channels for facilitating circulation of fluid therethrough; and (f) connecting said unitary heat exchanger to a fluid source means for circulating fluid within said open channels and positioning said heat exchanger adjacent to an object for controlling the temperature of said object by controlling the characteristics of said fluid.

2. The method of claim 1, wherein said step of forming said body about said fibers comprises electrodepositing said body forming material on conductive outer surfaces of said fibers.

3. A method for making a unitary article having a body with a plurality of enclosed fluid channels extending through said body, comprising the steps of:

(a) providing a plurality of fibers;

(b) arranging said fibers in accordance with a predetermined pattern;

(c) forming said body as a single structure encompassing each of said plurality of fibers, as arrange dins aid predetermined pattern, by chemically depositing body forming material about said plurality of fibers for enveloping said plurality of fibers and for generating said single structure body of said unitary article with said plurality of enclosed channels in said body about said fibers;

(d) changing the relative cross sectional areas of at least one of the cross sectional areas of said fibers and said channels so that the cross sectional areas of said channels become larger than the cross sectional areas of said fibers; and (e) extracting said fibers from within said channels thereby leaving open channels for facilitating circulation of fluid therethrough.

4. The method of claim 3, wherein said step of chemically depositing body forming material and forming said body about said fibers comprises the deposition of a metal and the formation of a metallic body.

5. The method of claim 4, wherein said step of chemically depositing body forming material and forming said body about said fibers further comprises electrodepositing said metal on conductive outer surfaces of said fibers.

6. The method of claim 5, wherein said step (b) comprises operatively securing each of said plurality of fibers to a means for holding and arranging said fibers in accordance with the predetermined pattern.

7. The method of claim 6, wherein said step of electrodepositing said body forming material and forming said body further comprises:

(i) immersing the fibers, as positioned by the means for holding and arranging said fibers, in a bath of electrolytic solution containing a material to be chemically deposited on the fibers;

(ii) applying an electric charge to the fibers; and (iii) rotating said means for holding and arranging said fibers in the electrolytic solution so as to electrodeposit the material on the fibers to form the body of said unitary article as a single structure.

8. A method for making a unitary article having a body with a plurality of enclosed fluid channels extending through said body, comprising the steps of:

(a) providing a plurality of fibers;

(b) operatively fixedly attaching each of said plurality of fibers to a means for holding said fibers in fixed positions relative thereto and for arranging said fibers in accordance with a predetermined pattern;

(c) forming said body about said fibers, as positioned according to said means for holding and arranging said fibers, by depositing body forming material for enveloping said fibers and thereby generating said unitary article with said enclosed channels in said body about each of said fibers;

(d) changing the relative cross sectional areas of a least one of said fibers and said channels so that the cross sectional areas of said channels become larger than the cross sectional areas of said fibers; and (e) extracting said fibers from within said channels thereby leaving open channels for facilitating circulation of fluid therethrough.

9. The method of claim 8, wherein step (c) includes the step of electrodepositing material on conductive outer surfaces of said fibers to form the body.

10. The method of claim 8, wherein the fibers are constructed of extensible material and wherein step (d) comprises the step of elongating said fibers in a longitudinal direction to reduce the cross sectional area of said fibers with respect to the cross sectional are of said channels to facilitate the extraction of said fibers from said channels in step (e) of claim 8.

11. The method of claim 8, wherein step (d) includes the step of altering the temperature of the body and said fibers to increase the relative cross sectional area of said channels with respect to the cross sectional area of said fibers and to facilitate the extraction of said fibers from said channels in step (e) of claim 8.

12. The method of claim 11, wherein said fibers comprise tubes constructed of plastic that radially contract in response to the increase of temperature of the tubes to reduce the cross sectional area of said fibers with respect to the cross sectional area of said channels and to facilitate the extraction of said fibers from said channels in step (e) of claim 8.

13. The method of claim 8, further including prior to step (c) the step of coating said fibers with a material that reduces the coefficient of friction between said fibers and the surface of said channels to facilitate the extraction of said fibers from each channel in the article in step (e) of claim 8.

14. The method of claim 8, wherein step (b) includes the step of placing at least two of said fibers in contact with each other prior to step (c) to produce at least two channels that intersect within the body.

15. The method of claim 8, further including in step (a) the step of providing fibers having outer sheathing layers.

16. The method of claim 15, further including in step (e) the step of extracting said fibers from said channels while separating the sheathing layers from said fibers so that the sheathing remains in said channels.

17. The method of claim 10, wherein the extensible fibers are constructed of unoriented polymeric material.

18. The method of claim 8, wherein step (c) includes the steps of:

(a) immersing the fibers, as positioned by the means for holding and arranging said fibers, in a bath of electrolytic solution containing a material to be deposited on the fibers;

(b) applying an electric charge to the fibers; and (c) rotating said means for holding and arranging said fibers in the electrolytic solution so as to electrodeposit the material on the fibers to form the body of the article.

19. The method of claim 18, wherein the fibers are rotated in the electrolytic solution about an axis parallel to the fibers.

20. The method of claim 8, wherein the fibers have diameters in the range of 0.007 to 0.00025 inches.

21. The method of claim 8, wherein the fibers have diameters in the range of 0.003 to 0.00025 inches.

22. The method of claim 8, wherein step (b) comprises providing a surface and adhering said fibers to said surface in accordance with said predetermined pattern so that said fibers are arranged and held in place for deposition of said body forming material thereon.

23. The method of claim 22, further including during step (c) the step of removing said fibers from said surface to which said fibers have been adhered after partial deposition of said body forming material about said fibers and subsequently continuing deposition of said body forming material for enveloping said fibers.

24. The method of claim 23, wherein the step of providing the surface and adhering said fibers thereto further comprises coating said surface with a layer of pressure sensitive adhesive and applying said fibers to said surface with sufficient pressure to ensure that said fibers are positioned according to said predetermined pattern.

* * * * *

UNITED STATES PATENT AND TRADEMARK OFFICE
CERTIFICATE OF CORRECTION

PATENT NO. : 5,070,606

DATED : December 10, 1991

INVENTOR(S) : Hoopman et al.

It is certified that error appears in the above-identified patent and that said Letters Patent is hereby corrected as shown below:

On the title page, item [75] Inventor(s): should read as follows:
-- Timothy L. Hoopman, River Falls, Wisconsin; Dee L. Johnson, Woodbury, Minnesota; Harlan L. Krinke, May Township, Minnesota --.

Col. 6, line 11, "("FLOURINER$_{TM}$" 43) should be --("FLOURINERT$_{TM}$" 43)

Col. 7, line 23, "arrange dins aid" should be --arranged in said--

Col. 7, line 60, "solution" should be --solutions--

Col. 8, line 9, "a" should be --at--

Col. 8, line 23, "are" should be --area--

Signed and Sealed this

Twenty-fifth Day of May, 1993

Attest:

MICHAEL K. KIRK

*Attesting Officer*     Acting Commissioner of Patents and Trademarks